Dec. 29, 1942.  U. KNICK  2,306,888
ARRANGEMENT FOR PRODUCING HIGH UNIDIRECTIONAL VOLTAGE
Filed Jan. 30, 1941
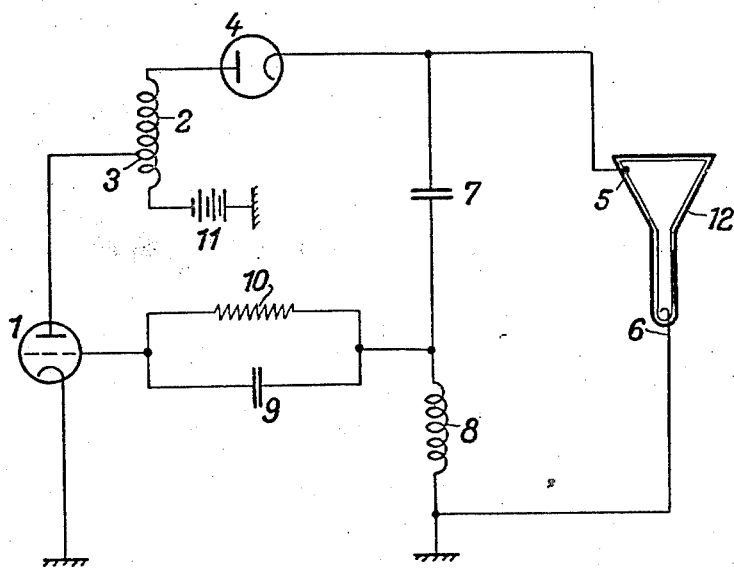
Inventor:
ULRICH KNICH
BY
ATTORNEY Patented Dec. 29, 1942

2,306,888

UNITED STATES PATENT OFFICE 2,306,888

ARRANGEMENT FOR PRODUCING HIGH UNIDIRECTIONAL VOLTAGES

Ulrich Knick, Berlin-Zehlendorf, Germany; vested in the Alien Property Custodian Application January 30, 1941, Serial No. 376,671
In Germany January 23, 1940

5 Claims. (Cl. 171—97)

This invention relates to arrangements for producing a high direct current voltage from a low direct current voltage and particularly relates to an arrangement for generating the anode voltage for cathode ray tubes.

It is an object of the present invention to provide a simple arrangement producing the high direct current voltage required for cathode ray tubes without great losses of energy. Another object is to provide an arrangement in which the high direct current voltage is easily smoothed and can be directly applied to the cathode ray discharge tube.

A high direct current voltage has hitherto been produced by stepping up an alternating current voltage generated by a tube oscillator, rectifying the high alternating current voltage and smoothing out residual oscillations so that the direct current voltage can be used as the anode voltage for a cathode ray tube. Arrangements of this type usually contain an oscillator tube in which the anode circuit and the grid circuit are inductively coupled and the anode is connected to a tapped point of the oscillator coil. This anode circuit comprises the oscillator coil and a condenser. The high alternating voltage is rectified by means of a rectifying tube. This method, however, is not advantageous when the voltage becomes very high because the loss of energy increases according to the formula $$N = \frac{U^2}{R}$$

in which N is the loss of energy, U the voltage and R the resistance of the circuit containing the coil and the condenser at the resonance frequency. The losses increase with the square of the voltage and become large in comparison with the useful energy required by the cathode ray tube.

It is therefore necessary to make the loss of energy small in comparison to the useful energy. For this reason the resistance R must be made large and this could be done by omitting the condenser in the circuit. The capacity of the oscillating circuit would be lowered thereby so that only the capacity of the rectifying tube and the capacity of the coil would remain. This, however, has the drawback that the vacuum tube generator does not produce oscillations at the natural frequency of the circuit containing the rectifier tube and the coil but at another frequency, for example, that corresponding to the circuit consisting of the anode capacity of the generator tube and the inductance of the tapped section of the anode coil, because the coupling is particularly close for this frequency. The frequency produced in this circuit, however, differs largely from that of the oscillator circuit containing the coil and the capacity of the rectifying tube so that the voltage is not properly stepped up in the transformer.

According to the invention this and other drawbacks are avoided in a particularly simple manner by suppressing a direct feed-back between the anode and the grid circuits of the oscillator tube and by feeding back energy by way of the capacity of the rectifier tube.

Other aspects of my invention will be apparent or will be specifically pointed out in the description forming a part of this specification, but I do not limit myself to the embodiment of the invention herein described, as various forms may be adopted within the scope of the claims.

Referring to the drawing the single figure represents a diagram of the circuit according to the invention.

The generator includes an oscillator tube 1. The anode of this tube is connected to a point 3 of a coil 2. One side of this coil is connected to the positive point of a source of potential, for example, a battery 11, while the other terminal is connected to the anode of a rectifier tube 4. The grid of tube 1 is connected to a condenser 9 and resistor 10 arranged in parallel. The cathode of the diode 4 is connected by way of a condenser 7 to the arrangement consisting of condenser 9 and resistor 10. The common point of the condenser 7 and the capacity resistance arrangement is connected to a coil 8. The high direct current voltage is taken off between the cathode of the diode and the grounded terminal of coil 8. This voltage is applied between the cathode 6 and the anode 5 of a cathode ray tube 12.

The arrangement operates as follows:

By suitably choosing the tapping point 3 the desired transformation of the alternating current voltage existing at the anode of tube 1 can be obtained. The alternating current voltage is rectified by the diode 4 and the rectified voltage is smoothed by condenser 7. The feed-back of the generator tube 1 is not obtained by means of an inductive coupling of the anode circuit with the grid circuit of tube 1, but the feed-back voltage is produced by the current flowing through coil 8 and determined by the capacity of the diode and the condenser 7. The phase of this feed-back-voltage is shifted by 180 degrees against the anode voltage for the natural frequency of the circuit. The arrangement consisting of condenser 9 and resistor 10 is used for producing the grid-bias-potential of tube 1. In order to regulate the feed-back-voltage an adjustable condenser 12 may be provided in parallel to coil 8, as indicated in dotted lines in the drawing, so that the effective inductance of the feed-back-resistance is increased.

The invention can be used for producing the voltage required for operating cathode ray tubes. It is of particular advantage in television devices containing image analysing tubes and for television receiver arrangements including projection tubes operating with voltages in the order of 10,000 to 60,000 volts.

What I claim is:

1. An arrangement for developing a high unidirectional voltage from a low unidirectional voltage, comprising an oscillator tube having a cathode, a control element and an anode, a source of low unidirectional voltage for applying an operating voltage to said anode, a transformer connected in the anode circuit of said tube, a rectifier, means for connecting said rectifier to said transformer to rectify the alternating voltage developed thereat, a control element circuit, a feed-back path for feeding energy from said anode circuit to said control element circuit thereby to maintain the oscillations of said oscillator tube, said feed-back path including said rectifier, and a high-voltage output circuit coupled to said rectifier.

2. An arrangement for deriving a high unidirectional voltage from a low unidirectional voltage, comprising an oscillator tube having a cathode, a control element and an anode, a source of low unidirectional voltage for applying an operating voltage to said anode, a voltage step-up transformer coupled to said anode to form a portion of the anode circuit, a control element circuit, a rectifier tube connected between the high-voltage end of said step-up transformer and said control element circuit for rectifying the alternating voltage developed at said transformer and for providing a feed-back path between said circuits, thereby to maintain the oscillations of said oscillator tube, and a high voltage output circuit coupled to said rectifier tube.

3. An arrangement for deriving a high unidirectional voltage from a low unidirectional voltage, comprising an oscillator tube having a cathode, a control element and an anode, a source of low unidirectional voltage for applying an operating voltage to said anode, a voltage step-up transformer coupled to said anode to form a portion of the anode circuit, a control element circuit including a coil, a rectifier tube connected between the high-voltage end of said step-up transformer and one end of said coil for rectifying the alternating voltage developed at said transformer, and for providing a feed-back path between said circuits, thereby to maintain the oscillations of said oscillator tube, and a high-voltage output circuit coupled to said rectifier tube.

4. An arrangement for deriving a high unidirectional voltage from a low unidirectional voltage, comprising an oscillator tube having a cathode, a control element and an anode, a source of low unidirectional voltage for applying an operating voltage to said anode, a voltage step-up transformer coupled to said anode to form a portion of the above circuit, a control element circuit, a rectifier tube connected in series relation with a condenser between the high-voltage terminal of said step-up transformer and said control element circuit for rectifying the alternating voltage developed at said transformer and for providing a feed-back path between said circuits, thereby to maintain the oscillations of said oscillator tube, and a high voltage output circuit coupled to said rectifier tube.

5. An arrangement for deriving a high unidirectional voltage from a low unidirectional voltage, comprising an oscillator tube having a cathode, a control element and an anode, a source of low unidirectional voltage for applying an operating voltage to said anode, a voltage step-up transformer coupled to said anode to form a portion of the anode circuit, a control element circuit including a coil, a rectifier tube connected between the high-voltage end of said step-up transformer and one end of said coil for rectifying the alternating voltage developed at said transformer and for providing a feed-back path between said circuits, thereby to maintain the oscillations of said oscillator tube, a condenser connected in parallel relation with said coil, and a high-voltage output circuit coupled to said rectifier tube.

ULRICH KNICK.